No. 648,117. Patented Apr. 24, 1900.
J. S. STUBBLEFIELD.
GEOGRAPHICAL GLOBE.
(Application filed May 11, 1899.)
(No Model.)
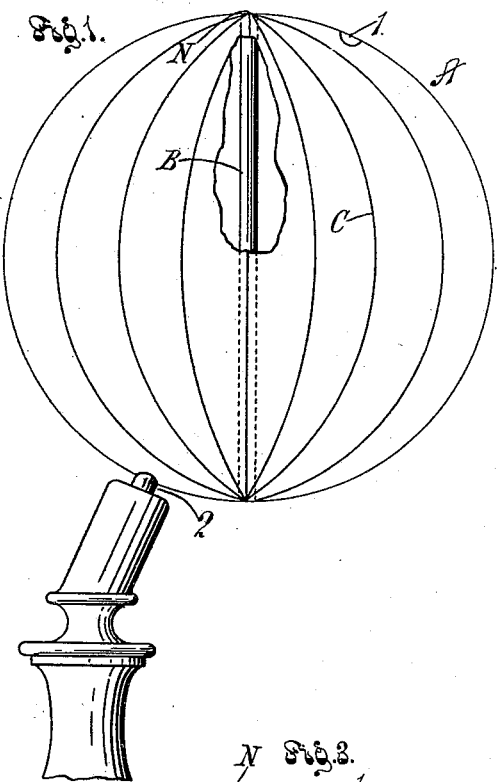
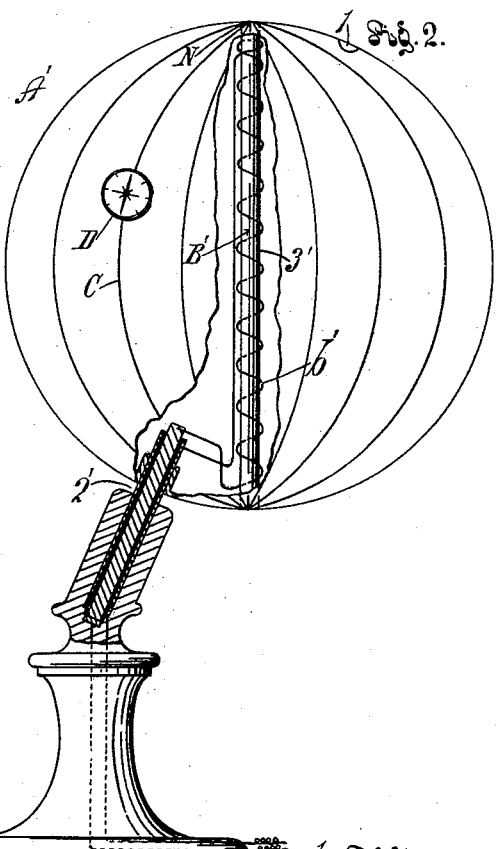
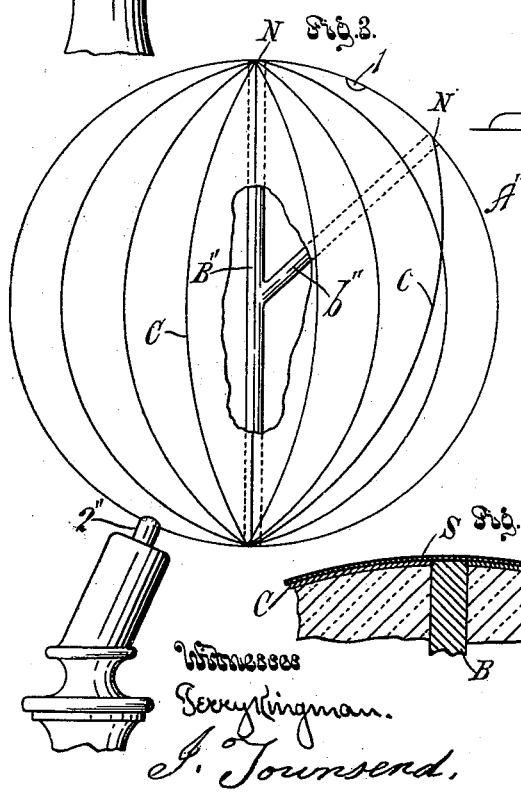
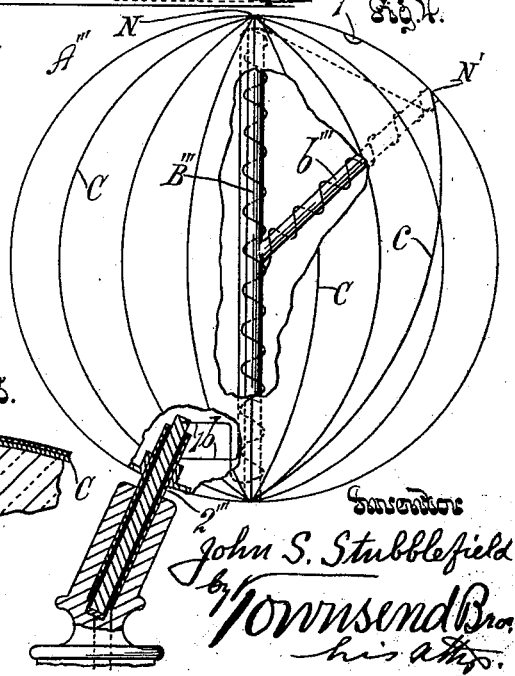
Witnesses
Perry Kingman.
J. Townsend.
Inventor
John S. Stubblefield
by Townsend Bro.
his attys.

UNITED STATES PATENT OFFICE.

JOHN S. STUBBLEFIELD, OF LOS ANGELES, CALIFORNIA.

GEOGRAPHICAL GLOBE.

SPECIFICATION forming part of Letters Patent No. 648,117, dated April 24, 1900.

Application filed May 11, 1899. Serial No. 716,453. (No model.)

*To all whom it may concern:*

Be it known that I, JOHN S. STUBBLEFIELD, residing at Los Angeles, in the county of Los Angeles and State of California, have invented a new and useful Geographical Globe, of which the following is a specification.

The object of my invention is to provide superior means for teaching geography; and it relates particularly to the explanation of the magnetic phenomena of the earth.

My invention comprises a geographical globe provided with a magnet the north pole of which is located in the globe to correspond with the magnetic north pole of the earth.

My invention may be applied in various ways, and embraces the various features and combinations hereinafter described and claimed.

The accompanying drawings illustrate my invention as applied to school geographical globes. The map-surface is omitted in Figures 1, 2, 3, and 4.

Fig. 1 is a view of a globe provided with a single permanent magnet to indicate a north magnetic pole of the earth. A portion of the globe is broken away to expose the magnet. Fig. 2 is a like view of a globe provided with a single electromagnet. Fig. 3 is a view of a globe provided with magnets the north poles of which are arranged relatively the same as the north magnetic poles of the earth. Fig. 4 is a view of a globe with electromagnets the north poles of which are arranged to correspond with the north magnetic poles of the earth. Fig. 5 is an enlarged fragmental sectional detail.

In the several views, A, A', A'', and A''' indicate geographical globes.

1 represents the north pole of the axis of the earth, and 2 the south pole of the axis of the earth.

B indicates a permanent magnet in globe A, the north pole of said magnet being located at N to represent a north magnetic pole of the earth and the south pole of the magnet being located in the Southern Hemisphere, as indicated at S. In Fig. 2, B' indicates an electromagnet arranged in a similar manner in globe A'. b' indicates the conductor, leading through the south pole 2' of the axis of rotation into the interior of the globe A' to energize the core 3' of the magnet.

The form shown in Figs. 1 and 2 may ordinarily be used in the common schools, and the north pole of the magnet will be located to correspond with the north magnetic pole of the Western Hemisphere.

In Fig. 3, B'' indicates a main magnet, and b'' a submagnet, the main magnet being located to correspond with the magnetic pole in the Western Hemisphere and the north pole of the magnet b'' being located to correspond with the magnetic pole in Siberia.

In Fig. 4, B''' indicates an electromagnet the north pole N of which is located to correspond with the magnetic pole of the Western Hemisphere, and b''' is an electromagnet the north pole N' of which is located to correspond with the north magnetic pole in Siberia. The conductors 1$^b$ in this form lead out at the axis of rotation the same as in the form shown in Fig. 2.

In the several views, C indicates magnetic meridians, which are preferably composed of metallic bars or strips arranged at or near the surface of the globe and which extend along lines indicated by the variation of the magnetic needle on the earth's surface in the Western Hemisphere. These bars or strips lead to the north pole of the magnet located in the Western Hemisphere. c indicates like metallic bars or strips leading to the north magnetic pole N', indicated in Siberia.

D indicates a compass which in practical use of the globe will be moved about on the surface of the globe, thus to exhibit to the pupil the action of the magnetic currents of the earth upon the magnetic needle.

The electromagnetic arrangement is preferable where available, such magnet being stronger than the permanent magnet, and the passing of the current around it may also be used to illustrate the electric current passing around the earth and which forms the magnetic poles of the earth.

The magnetic meridians C C are for the purpose of strengthening and helping to maintain the magnetism, especially in the permanent magnet. They also give direction to the compass-needle, and where the compass-needle varies from the magnetic poles the meridians may be bent and located to indicate this variation. Said meridians should be bent so as to show the lines of magnetic force as they are supposed to be on the earth. The meridians and also the magnetic poles may be sunk a little below the surface of the globe and the map-surface S be mounted over them, as indicated in Fig. 5, and they may or may not be indicated on the surface of the unfinished globe.

Now, having described my invention, what I claim as new, and desire to secure by Letters Patent, is—

1. A geographical globe provided with a magnet, the north pole of which is located in the globe to correspond with a magnetic north pole of the earth.

2. A geographical globe provided with two magnets, the north poles of which are located in the globe to correspond with the magnetic north poles of the earth respectively.

3. A geographical globe provided with an electromagnet, the north pole of which is located in the globe to correspond with a magnetic north pole of the earth.

4. A geographical globe provided with two electromagnets, the north poles of which are located in the globe to correspond with the magnetic north poles of the earth.

5. A geographical globe provided with a magnet, the north pole of which is located to correspond with a magnetic north pole of the earth, and metallic bars or strips arranged substantially along lines indicated by the variation of the magnetic needle on the earth's surface.

6. A geographical globe provided with a magnet, the south pole of which is in the Southern Hemisphere and the north pole in the Northern Hemisphere substantially as and for the purpose set forth.

7. A geographical globe provided with an electromagnet, the south pole of which is in the Southern Hemishere and the north pole in the Northern Hemisphere substantially as and for the purpose set forth.

JOHN S. STUBBLEFIELD.

Witnesses:
JAMES R. TOWNSEND,
F. M. TOWNSEND.